United States Patent [19]

Posiviata et al.

[11] 4,125,493

[45] Nov. 14, 1978

[54] FIBRATED ADMIX OR POLYMER AND PROCESS THEREFORE

[75] Inventors: Richard W. Posiviata, Lakewood; Jonathan A. Johnston, Denver, both of Colo.

[73] Assignee: The Gates Rubber Company, Denver, Colo.

[21] Appl. No.: 783,926

[22] Filed: Apr. 1, 1977

[51] Int. Cl.² .............................................. C08L 1/02
[52] U.S. Cl. ............................ 260/17.4 CL; 106/204; 162/28
[58] Field of Search ................ 260/17.4 CL; 106/204; 241/7, 28; 162/21, 58, 28; 536/77; 428/361

[56] References Cited

U.S. PATENT DOCUMENTS

| | | | |
|---|---|---|---|
| 3,572,593 | 3/1971 | Guarisco | 241/28 |
| 3,596,840 | 3/1971 | Blomqvist | 241/28 |
| 3,697,364 | 10/1972 | Boustany et al. | 428/266 |
| 3,709,845 | 9/1973 | Boustany et al. | 260/17.4 CL |
| 3,943,079 | 9/1976 | Hamed | 260/17.4 CL |

*Primary Examiner*—Theodore Morris
*Attorney, Agent, or Firm*—H. W. Oberg, Jr.; Raymond Fink; Curtis H. Castleman, Jr.

[57] ABSTRACT

A process for preparing: 1) a generally dry fibrated admix; 2) a powdered elastomer/fiber composite master batch or fully compounded stock; or 3) an elastomer/fiber composite master batch or fully compounded stock; by mixing a partitioning agent and, optionally, plasticizers or adhesives with a generally dry defiberized material to define the fibrated admix; and blending the fibrated admix with a powdered polymer to define a powdered master batch or compounded stock; or dispersing the fiber in a viscoelastic mass to define a master batch or fully compounded stock or formed article, and then curing the mass to define an improved fiber composite structure.

22 Claims, 12 Drawing Figures

FIBRATED ADMIX OR POLYMER AND PROCESS THEREFORE

BACKGROUND OF THE INVENTION

The invention relates to stock material and miscellaneous articles, but more particularly, the invention relates to fiber preparation for a generally dry fibrated admix that is dispersible into a polymeric or preferably, a viscoelastic mass of the heat curable rubber type.

Discontinuous fibers have long been used as fillers or reinforcements for polymer and elastomeric materials. The fibers may be non-regenerated cellulose such as cotton or fiberized wood, or fiberized synthetic filaments such as nylon, aramid, polyester or glass. Cellulosic or synthetic fibers have not only been used as fillers, but they have also been used as reinforcements in rubber articles such as tires, hose and power transmission belts. As particularly discussed in U.S. Pat. No. 3,697,364 and 3,709,845, it is very difficult to mix fibers into massed rubber with good dispersion because the fibers tend to cling together in bundles or prills rather than being homogeneously dispersed into the rubber.

The above cited references teach improvements for dispersing and bonding discontinuous cellulosic fibers, or mixtures thereof, in a viscoelastomeric matrix to yield a vulcanized composite with increased Young's modulus. As taught thereby, fiber dispersity in rubber is enhanced by a process that involves slurrying fibers in liquid latex and then coagulating the latex on the fibers. The coagulation is filtered and dried leaving "pellets" or "curd" agglomerations of latex encapsulating and bonding together clusters of unoriented fibers. The object of the latex coating on the fiber clusters is to reduce fiber-to-fiber interactions and fiber breakage when the pellets are dispersed in a viscoelastomer with an intensive mixing means such as a cold-feed extruder, Banbury mixer or mill.

While it may be easy to disperse the fibrated pellets into a viscoelastomer, the cluster of fibers within each pellet are not evenly or easily dispersible either within the pellet of from the pellet to the elastomeric matrix. Coagulation drying partially cures the latex forming hard fiberized pellets which are not easily broken down during viscoelastomer mixing. The hard pellets are easier to break down in high viscosity viscoelastomeric compounds such as disclosed in the above-mentioned patents. This is because the higher viscosity stocks impart more shear to the pellets during mixing than lower viscosity elastomers such as normally used in hose, tires or power transmission belts.

The reduced dispersibility of the encapsulated fiber clusters of the pellets hampers fiber orientation during mixing into a viscoelastic elastomer and affects the physical properties of the cured fibrated elastomer (such as tensile strength and Young's modulus). The physical properties become dependent on generally unbroken fibers and an empirical relationship of fiber aspect ratio. The pellets inhibit the rheological properties by impeding flow of the mixed rubber stock such as during molding or extruding. The disuniformity of fiber dispersion in a cured elastomer is characterized by a pocked appearance in the surface of a finished product when it is subjected to strain.

The characterization of a fiberized rubber stock by measurements such as a high Young's modulus, an increase of matrix modulus and high tensile to break, are not always critical parameters relied on by those skilled in the art of designing and manufacturing such rubber articles as hose, tires, or power transmission belts. This is primarily because such rubber articles are made using elastomeric materials that do not follow Hooke's law where stress is proportional to strain and on which Young's modulus is based. Also, such rubber articles are designed to operate at stress levels substantially below maximum tensile to break or at large percentage elongation. Physical properties of fiber/elastomeric composites may better be characterized by more traditional elastomer technology terms such as secant modulus (e.g. stress at a specified elongation, preferaby 5 to 10% for fiber composites); or comparative shapes of stress-strain curves for different fiber composite elastomers, in combination with a ratio of projected area of the stress-strain curves to indicate work capacity and fatigue life. However, a comparative evaluation of "tensile to yield" is a good expedient for evaluating elastomer-fiber adhesive systems.

Accordingly, the attainment of a process which yields an improved use of fiber in elastomers is an important advance in the art.

SUMMARY OF THE INVENTION

In accordance with the invention, a process is provided for preparing a generally dry fibrated admix for reinforcing or filling viscoelastomers such as the natural or synthetic rubbers or blends thereof. The admix is dispersed in the elastomer to yield a cured fiber-elastomer composite having improved physical characteristics for products such as hose, tires, or power transmission belts.

The fibrated admix is prepared by blending a mass of sized synthetic fibers, non-regenerated cellulosic fibers, or combinations thereof with conditioners which aid in strengthening, adhering, and dispersing the fibers when mixed with a viscoelastomer.

A suitable mass of synthetic fibers may be prepared by fibrilizing or classifying the fibers with a mechanical action device to a desired length. Limp high tenacity fibers like aramid and polyester may be prepared by stiffening them with a stiffening agent, such as dried and heat-cured solution of blocked phenolisocyanate. Stiffer fibers such as nylon, fiber glass, softwood cellulose, or hardwood cellulose may be handled without a stiffening treatment.

Some fiber sources such as shredded newsprint do not require a high degree of fiberizing and screening because the size distribution of newsprint fiber is generally satisfactory for most fiber-elastomer composites. The inherently stiffened (with lignin) newsprint material may be easily defiberized by impacting with blades. If desired, however, the newsprint material may be mechanically fiberized and fibrilized with a hammermill or similar mechanical action device.

Conditioners are added to the fibrous material in a high intensity blender such as one with spinning blades. In the case of cellulose, a polar liquid such as water or ethylene glycol may be added in small quantities. The liquid is adsorbed by the fibers and acts as a vehicle for coating the fibers with a water soluable adhesive, (if desired). A partitioning agent like carbon black or clay may be added to the fiber mixture to help separate or partition the individual fibers from each other. When shredded newspaper is used as the fiber material, the carbon black also aids in fiberization and fibrilization during blending. Oil may then be added to the mixture to concentrate the fibrated admix into a smaller volume and minimize free carbon black dust. The oil also aids in dispersing the fiber in a viscoelastic mass.

The fibrated admix may then be used with formulated elastomeric powders or bulk elastomers to establish either elastomeric master batches or fully compounded stocks. In either case, the fibrated admix is dispersed in a viscoelastomer with mechanical means such as a cold-feed extruder, Banbury mixer, mill or the like. The fibers are substantially evenly dispersed in the elastomer and generally oriented in the direction of elastomer flow during mixing.

A fiber-elastomer composition like rubber exhibits increased physical characteristics such as higher secant modulus than was attainable in the prior art at the same volume of fiber loading. The improved characteristics are believed to result from improved dispersion and packing of the fiber in the viscoelastomer rather than being directly dependent on fiber length or aspect ratio. While fiber aspect ratio is an inherent characteristic of all fibers and while some physical properties are always linkable thereto, it is believed that the morphological properties of the fibers are more important for imparting reinforcement to elastomers like rubber.

An object of the invention is to provide a fibrous admix that is easily dispersed when mixed in a viscoelastomer.

Other objects of the invention are to provide processes for preparing sized fibers and a generally dry fibrated admix.

Another object of the invention is to provide a fiber reinforced composite having improved physical and structural characteristics.

An advantage of the invention is that expensive processing steps such as liquid slurring and elastomer coating of fibers (e.g., with latex coagulating or rubber friction coating of fabric with a calender) prior to incorporation into a viscoelastomer are eliminated.

These and other objects or advantages of the invention will be apparent after reviewing the drawings and description thereof wherein.

DESCRIPTION OF PREFERRED EMBODIMENTS

Figure 1:
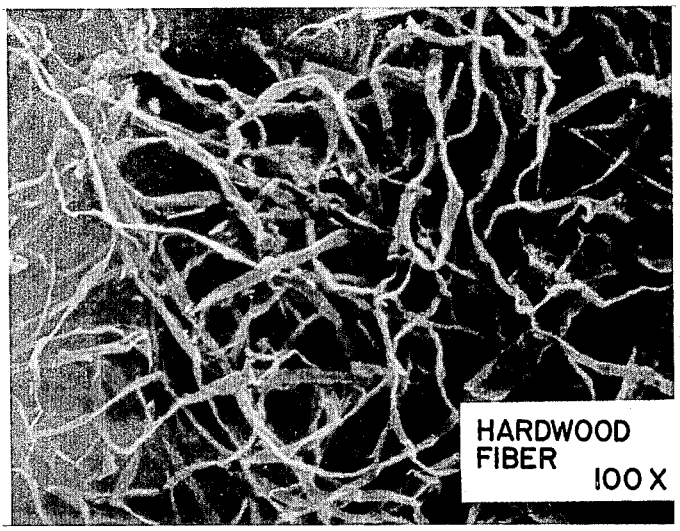
FIG. 1 is a scanning election microscope (SEM) photomicrograph at 100 × magnification showing hardwood fiber as prepared in accordance with the invention.

Several types of fiber may be used in practicing the invention. The fiber is classified or sized for dispersion into a viscoelastomer. The degree of fiber classification or fibrilization varies with the fiber type.

Synthetic or non-regenerated cellulose fibers may be used. Synthetic fibers are commercially available as continuous monofilaments or as chopped filaments. It is preferable to start with chopped filaments about 6mm long.

Limp high tenacity fibers like aramid and polyester are prepared for fibrilization and sizing by stiffening them. Aramid is the generic name for fiber made from the condensation product of isophthalic or terephthalic acid and m- or p-phenylenediamine. An example of such fibers is sold under the trademark Kevlar as manufactured by duPont. The fibers may be treated with a stiffening agent such as a 13 percent solution of blocked phenolisocyanate, dried and heat-cured at 260° C. Other fibers such as nylon, fiber glass, softwood cellulose, or hardwood cellulose, do not have to be prestiffened for fibrilization. Newsprint fibers are naturally stiffened with lignin. Newsprint is a cheap machine-finished paper made chiefly from ground wood without purification and with a little chemical pulp to give it strength. However, all fibers could be optionally pre-stiffened if desired.

As used herein, the term "defibrated cellulose" refers to cellulose such as wood, hemp, flax, jute, cotton or the like which has been separated into its fibrous constituents as a pulp sheet, waste paper, partly cooked wood or the like. The terms "fibrilize", "fibrilization", or the like refers to further breaking down of fibers to include fibrils or appendaged fibrils such as by mechanically beating the fibers. The word "fibrated" refers to containing fibers or fibrous materials while the term fiberize refers to reducing or separating into fibers.

The fibers are mechanically impacted with a device, such as a hammermill, to an acceptable size range that is substantially dependent on fiber stiffness. Mechanical impacting the fibers causes them to split, crack, tear or otherwise fibrilate to lengths less than their input lengths. Generally, fibers having the greater stiffness may be longer than those fibers of lesser stiffness. Accordingly, acceptable fiber length may be optionally altered by pretreating the fiber with stiffening agents.

An acceptable size range for any fiber, whether prestiffened or not, is a median length of about 0.03mm to about 2.9mm, or more preferably about 0.1mm to about 2.3mm, and most preferably about 0.2mm to about 1.7mm.

More particularly, an acceptable size range for unstiffened softwood fibers is a median length of about 0.08mm to about 2.9mm, or more preferably about 0.2mm to about 2.3mm, and most preferably about 0.6mm to about 1.7mm.

An acceptable size range for unstiffened hardwood fibers is a median length of about 0.04mm to about 1.4mm, or more preferably, about 0.1mm to 1.1mm, and most preferably about 0.3mm to 0.9mm.

The acceptable range for newsprint fiber that is naturally stiffened with lignin, is a median length (i.e., largest total dimension after fibrilization) of about 0.8mm to about 2.9mm, or more preferably about 0.2mm to about 2.3mm and most preferably about 0.6mm to about 1.7mm.

The acceptable size range for synthetic fibers is a median length of about 0.03 to about 2.5mm.

More particularly, the acceptable size range for a 1.5 denier per filament prestiffened aramid fiber is a median length of about 0.03mm to about 1.6mm, or more preferably about 0.06mm to about 1.1mm, and most preferably about 0.17mm to about 0.6mm.

To further illustrate the affect of fiber stiffness on acceptable lengths, an acceptable size range for 6 denier per filament prestiffened polyester fiber is a median length of about 0.05mm to about 2.5mm, or more preferably about 0.13mm to about 1.6mm, and most preferably about 0.38mm to about 1.25mm.

Some fiber sources to not require a high degree of mechanical work for fiberization. Newsprint may be shredded and coursely fiberized with rotating blades having a velocity of about 40 to about 50 meters per second. An example of a rotating blade device is a high intensity mixer, model 50JSS, as manufactured by Prodex Henschel. However, fiberized newsprint does not require a high degree of mechanical work for substantially complete fiberization and fibrilization as other fibers because newsprint is composed of fibers with a length range approaching that as above described. Shredded or coursely fiberized newsprint may be completely fiberized and fibrilized by processing it through a hammermill having an appropriately sized discharge screen. Optionally, partially fiberized newsprint may be satisfactorily fiberized and fibrilized by mixing partitioning agents such as carbon black or clay with the fiber and blending with a spinning blade mixer. It is believed the dry partitioning agents additionally act as abrasives which aid in fiber fibrilization.

The fiber mass is placed in a mechanical action blender such as the whirling blade type as described above for generally fluffing and untangling the fibers. Alternately, some fiberized material like newsprint which has not undergone fibrilization may be directly added to the blender. As will later be explained, pre-fibrilization of some fibers results in improved physical characteristics when mixed with some viscoelastomers.

For adhesive purposes, non-regenerated cellulose fibers may be treated with absorbate liquids and preferably polar liquids such as water or ethylene glycol at about 6 to 12 parts by weight of fiber. The liquid is absorbed by the cellulosic fibers. Through testing, it has been determined that ethylene glycol or water may be added from about 1 to about 20 parts by weight of the fiber. Excess liquid is not beneficial and may act to cause undesirable fiber prilling during blending. Shredded or chopped newsprint may be added to the blender and impacted until it is defibrated and fluffed. The time for defibrating sheet materials into fibrous constituents varies but it usually takes from about 10 to 15 minutes.

Powdered or liquid adhesives are added when chemical bonding between the fiber and elastomer is desired. It is preferred that the powder or liquid adhesive be soluble in the absorbate liquid so that the adhesive may partially coat or be partially absorbed by the fibers. In the case of cellulosic fibers, whether they be hardwood, softwood or newsprint, a water soluble adhesive is preferred because it can be dissolved and partially absorbed by moisture in the fibers. For prestiffened fibers (e.g., aramid or polyester) it is preferred that the stiffening agent also be a chemical agent adhesive (such as blocked phenolisocyanate). Adding the adhesive directly to the fiber assures that adhesive is coated or dusted on portions of the fibers.

Examples of suitable adhesives that may be blended with the dry fibers are resorcinol/formaldehyde dry resin, or the reaction product of resorcinol and melamine. In the case of synthetic fibers, adhesives such as isocyanate, epoxy, phenolic resins, or resotropin may be used. Of course, any adhesive system may be used depending on the type of bonding which is desired. The adhesive should be chosen for a particular elastomer and added at generally known parts by weight as is known in the art (usually about 1-10 parts based on fiber weight). As with all adhesive systems, the $p^H$, cure time, and temperature should be considered for maximum results when the fibers are incorporated into a viscoelastic means cured and tested. For example, an increase in modulus and tensile strength to break is realized by aging a cured composite 72 hours at room temperature or 21 hours in an oven at 200° F.

At this point, the fibers are generally separated from each other but they tend to cling to each other in a generally fluffed and untangled fibrous mass. The fibers are preferably treated to maintain separation from each other by the inclusion of a particulate partitioning agent such as clay, or preferably, substantially dry carbon black. Carbon black may be added from about 5 to about 100 parts by weight of fiber for a general fibrated admix. If a fully compounded rubber stock is to be prepared, up to about 200 parts of carbon black to fiber, by weight may be used. The partitioning agent is blended with the fiber mass for about 1 to 3 minutes which dusts fibers with particles and thereby partitions the fibers from each other. The carbon black also acts as an abrasive which helps fibrilize fibers like newsprint. Excessive blending time may cause prilling.

The order of adding oil to the fibrous composition should be considered because both the fiber and partitioning agent absorb oil. From about 1 to about 20 parts of oil by weight to fiber (most preferred) may be added to dry fiber. However, should the fibers be pretreated with water or ethylene glycol, the amount of oil added to the wet fibers should be reduced a proportionate amount and added at a most preferred range of about 5 to about 10 parts by weight of oil to fiber.

When oil is added after carbon black, from about 1 to about 200 parts of oil by weight of fiber can be used. Most preferably, a 2:1 to 1:2 black to oil ratio may be used. In either case, the oil is blended with fiber composition for about 1 to 3 minutes.

The oil is dispersed with and affixed to the fibers and carbon black particles. It is theorized that the oil forms a thin coating over the fiber which further aids in fiber dispersion when mixed in a viscoelastomer. The thus prepared fiber composition defines a fibrated admix which may then be used with a viscoelastomer such as rubber to constitute an elastomer-fiber composite where the fibers constitute from about 5 to about 60 percent of elastomer-fiber composite volume.

In the case of a rubber-type viscoelastomer, other additives may be included in the fibrated admix instead of being blended with the rubber per se. Examples of such additives are: activators, antioxidants, accelerators, and curatives. These additives are incorporated into the fibrous mass after the oil is blended with the fibers. Blending time may vary from about 1 to 3 minutes.

The fibrated admix may also be blended with a powered elastomer such as powdered rubber. The thus blended stock may define a master batch where further chemicals are required or the powdered rubber may contain, in combination with the fibrated admix, all chemicals necessary to define a fully compounded stock. Such chemical compounding (i.e., without the fibrated admix) is known in the art and need not be explained in detail here. Alternately, the fibrated admix may be directly mixed with bulk or slab viscoelastomers such as rubber to define either a master batch or a fully compounded stock. Nevertheless, in all types of mixing or blending of the fibrated admix, the viscoelastomer must be subjected to high shearing forces so that the fibers are dispersed therewithin. Such mixing may be done in a cold-feed extruder, a Banbury mixer, mill, Brabender mixer, or the like.

The criticality and effects of fiber preparation and fiber conditioners on the fibrated admix is established through numerous viscoelastomeric compositions and tests. A formulation is chosen for a viscoelastomeric stock comprising:

| Stock A: Ingredient | Parts by Weight |
|---|---|
| Styrene-butadiene rubber 1500 | 100.0 |
| Zinc oxide | 3.0 |
| Stearic acid | 2.0 |
| Antioxidant Symmetrical bisbetanaphthyl-p-phenylene - diamine | 1.0 |
| Accelerator N-cyclohexyl-D-benzothiazolsulfenamide | 1.25 |
| Sulfur | 2.0 |
| Adhesive for fibers, optional self curing recorcinol/formaldehyde | 0–3.0 |

| Stock A: Ingredient | Parts by Weight |
|---|---|
| dry resin | |

A plurality of Stock A compositions are prepared in accordance with 1975 ASTM Mixing Procedure D3182–D3187. A plurality of fibrated admixes are prepared with varying combinations of the following ingredients:

| Ingredient | Parts by Weight |
|---|---|
| Carbon Black (HAF) | 2.3 – 26 |
| Oil (process) | 0 – 20 |
| Fiber, (bleached softwood Kraft paper defibrated with hammermill having ⅛ inch round hole screen) | 0 – 25 |

The fibrated admixes are added to the Stock A compositions on a mill to observe and rate the ease of fiber mixing. The ease of fiber mixing is rated as easy, E, moderate, M, difficult, D, or extra difficult, XD. A plurality of control stocks are also prepared using the carbon black and oil variables so that the effect of the fiber in the stock may be isolated.

Mill mixing orients the fibers in the stock. Mixed specimens are cured to oscillating disc rheometer $T_{90}$, and tested in accordance with 1975 ASTM Test Procedure D412-08. However, the test data as presented herein are not corrected with Poisson's ratio. Also, all specimens are pulled at a rate of 50 cm. per minute because the rate has an affect on indicated modulus. Secant moduli at five percent, $M_5$, are measured for the various fiber and control stock mixes. The difference in secant modulus $\Delta M5$ between a stock with an additional ingredient and the control stock without the ingredient establishes the isolated effect of the ingredient in the stock as influenced by the fibrated admix variables. The tension required to yield the stock is measured to determine the effect of adding the adhesive to the stock/fiber blend. The fiber parts are varied to give a constant volume fraction of fiber for the various stock mixes (e.g., 5.4 or 12.7%). Table I summarizes the influence of fibrated admix variables on the fiber reinforcing effect to seventeen stock mixes.

TABLE I

| Mix No. | Fiber[1] Parts | Fiber[1] Vol. % | Black Parts | Oil[2] Parts | Adhesive Parts | Elastomer Matrix Mg - psi | Fiber Composite M5 psi | Δ M5 psi | Tension Yield lbs. | Fiber Mix Ease |
|---|---|---|---|---|---|---|---|---|---|---|
| 1 | 10 | 5.5 | — | — | — | 9.8 | 22.7 | 12.9 | 338.5 | XD |
| 2 | 25 | 12.7 | — | — | — | 9.8 | 93.9 | 84.1 | 501.4 | XD |
| 3 | 9.3 | 5.1 | 2.3 | — | — | 11.9 | 32 | 20.2 | 294.1 | D |
| 4 | 9.5 | 5.1 | 4.8 | — | — | 12.6 | 34.9 | 22.3 | 313 | D |
| 5 | 9.7 | 5.1 | 9.7 | — | — | 15.2 | 55.5 | 40.3 | 351 | D |
| 6 | 24.9 | 12.4 | 6.2 | — | — | 15.7 | 112.4 | 96.7 | 500.1 | D |
| 7 | 25.4 | 12.2 | 12.9 | — | — | 17.8 | 129.4 | 112.0 | 525.7 | D |
| 8 | 26 | 11.8 | 26 | — | — | 25.6 | 156.3 | 130.7 | 624.4 | D |
| 9 | 27 | 12.7 | 6.2 | 5 | — | 16.7 | 230.1 | 213.4 | 591.2 | E |
| 10 | 28 | 12.7 | 6.2 | 10 | — | 12.3 | 207.7 | 195.4 | 525.5 | E |
| 11 | 30.8 | 12.7 | 6.2 | 20 | — | 11.5 | 195.6 | 184.1 | 502.8 | E |
| 12 | 29.5 | 12.7 | 26 | 5 | — | 19.1 | 224.7 | 205.6 | 632.1 | D |
| 13 | 30.7 | 12.7 | 26 | 10 | — | 18.5 | 216.2 | 197.7 | 595.6 | M |
| 14 | 33.1 | 12.7 | 26 | 20 | — | 18.5 | 200.6 | 182.1 | 551.9 | E |
| 15 | 27 | 12.7 | 6.2 | 5 | 3* | 17.4 | 155.1 | 137.7 | 650.7 | E* |
| 16 | 30.8 | 12.7 | 6.2 | 20 | 3* | 13.5 | 131.6 | 118.1 | 61.2 | E* |
| 17 | 33.1 | 12.7 | 26.0 | 20 | 3* | 16.6 | 204.9 | 188.3 | 913.7 | E* |

*Adhesive difficult to add to elastomer matrix on mill
[1]Fiber parts are adjusted for each mix to obtain the volume fraction specified for each mix.
[2]Oil weight parts per 100 weight parts rubber hydrocarbon.

As indicated in Table I, carbon black per se improves the effectiveness of the fibers reinforcing effects in a stock. Differential secant modulus $\Delta M_5$ is increased from 12.9 psi (mix 1 with no carbon black) to 40.3 psi (mix 5 with 9.7 parts carbon black). Since the carbon black reinforcement affects on the rubber are subtracted through the control stock, the increase in $\Delta M_5$ modulus is due to mixing the dry fibers with carbon black per se.

added to the fibrated admix. Table II demonstrates the improvement achieved by making the fiber adhesive system part of the fibrated admix instead of a part of the viscoelastomer. It also emphasizes that oil alone is an effective ingredient for decreasing the fiber mixing effort to easy E.

TABLE II

| Mix No. | Fiber % Vol. | Oil Parts | Adhesive* Parts | Water Parts | Ethylene Glycol Parts | Elastomer Matrix M5 psi | Fiber Composite M5 psi | $\Delta$ M5 psi | Tension Yield Lbs. | Fiber Mix Ease |
|---|---|---|---|---|---|---|---|---|---|---|
| 18 | 12.7 | 0 | 3 | — | — | 35.6 | 170.7 | 135.1 | 1107 | XD |
| 19 | 12.7 | 1 | 3 | — | — | 32.8 | 273 | 240.2 | 1278 | D |
| 20 | 12.7 | 3 | 3 | — | — | 30.6 | 248.9 | 218.3 | 1216 | E |
| 21 | 12.7 | 5 | 3 | — | — | 24.2 | 298.7 | 274.5 | 1221 | E |
| 22 | 12.7 | 10 | 3 | — | — | 16.1 | 287.3 | 271.2 | 1157 | E |
| 23 | 12.7 | — | 3 | 1 | — | 35.6 | 269.1 | 233.5 | 1272 | D |
| 24 | 12.7 | — | 3 | 2 | — | 35.6 | 283.1 | 247.5 | 1237 | D |
| 25 | 12.7 | — | 3 | 5 | — | 35.6 | 264.6 | 229 | 1191 | D |
| 26 | 12.7 | 5 | 3 | 1 | — | 24.2 | 292.9 | 268.8 | 1174 | E |
| 27 | 12.7 | 5 | 3 | 2 | — | 24.2 | 290.2 | 266 | 1172 | E |
| 28 | 12.7 | 5 | 3 | 5 | — | 24.2 | 382.6 | 358.4 | 1210 | E |
| 29 | 12.7 | — | 3 | — | 3.1 | 35.9 | 458 | 422 | 1359.1 | D |
| 30 | 12.7 | — | 3 | — | 6.9 | 35.6 | 516.3 | 480.7 | 1182.8 | D |
| 31 | 12.7 | 5 | 3 | — | 3.1 | 39.1 | 556.8 | 517.7 | 1238.8 | E |
| 32 | 12.7 | 5 | 3 | — | 6.9 | 25.6 | 606.8 | 581.2 | 1245.3 | E |

*Adhesive added to and easily mixed with fiber

Also, the difficulty of adding the fibers to the stock is decreased from extremely difficult (XD) to difficult (D) as carbon black is added. It is believed that the carbon black acts as an effective partitioning agent when blended substantially dry with substantially dry fibers. The increase in $\Delta M_5$ is the result of better fiber dispersion in the stock.

Oil is added at Mix 9 and it is seen to have a significant effect by substantially improving mixing ease from difficult (D) to easy (E). Oil also significantly increases secant modulus $\Delta M_5$ from 113.8 psi (Mix 5) to 213.4 psi (Mix 9). Here again, the increase in secant modulus is believed to be a direct result of improved fiber dispersion as influenced by the substantially dry fibrated admix.

A comparison of Mixes 9 through 14 further shows that mixing ease may increase to difficult (D) (Mix 12) when there is a significantly smaller portion of oil to black parts. Hence, it is preferred that there are generally about the same or a greater number of oil parts to carbon parts.

The addition of the adhesive to the rubber stock significantly increases tension to yield as represented by the increase from 551.9 lbs (Mix 14) to 913.7 lbs. (Mix 17).

The criticality and improvement of an adhesive system disposed in the fibrated admix is demonstrated with the stock formulation A, without adhesive plus carbon black at 26 parts to define a stock formulation B.

A plurality of adhesive system fibrated admixes are prepared with varying combinations of the following ingredients.

| Ingredient | Parts by Weight |
|---|---|
| Oil (process) | 0 – 10 |
| Fiber, (softwood bleached kraft) | (12.7% by volume) |
| Adhesive self curing recorcinol/formaldehyde resin | 3 |
| Water | 0 – 5 |
| Ethylene glycol | 3.1 – 6.9 |

A plurality of specimens are mixed with the fibrated admixes, cured, cut and tested in the manner described above. Control stock specimens are also prepared to establish the isolated effect of each variable ingredient As represented in Table II, the addition of oil to the fibrated admix significantly improves the fiber mixing ease from extremely difficult XD (Mix 18) to easy E (Mixes 20-22) while simultaneously improving differential modulus $\Delta M_5$ from a low of 135.1 psi (Mix 18 with no oil) to a high of 274.5 psi (Mix 21). Improvements in mixing ease are believed to result from oil coating the fiber and acting as a plasticizing vehicle at the fiber/rubber stock interface when the fiber is mixed. Increases in tension to yield and differential modulus are twofold: the oil aids in distributing the adhesive in the fibrous mass and also, contributes toward a more uniform dispersement of the fibers in the rubber stock.

Water or ethylene glycol act as vehicles to dissolve the adhesive for at least partially penetrating or absorbing some of the adhesive into the fiber for improved adhesion. They also individually improve mixing ease over fiber coated with just adhesive.

Either water or ethylene glycol interassociate with the oil to yield significant improvement in secand modulus (Mixes 28 and 32 compared to Mix 21).

Having determined a system for getting a fibrated admix into a viscoelastomeric stock, fiber types, sizes, sources and amounts (e.g., volume fraction) may be evaluated to establish preferred fiber interrelationships and dispersibility with a more sophisticated elastomeric stock that would be suitable for rubber articles such as hose, tires or power transmission belts.

Several materials are fiberized in different manners to illustrate the effects of fiber configuration on rubber reinforcement. Sheeted, chopped, shredded or other forms of fibrous materials are passed through a hammermill having a herringbone discharge screen, HB. The screen is made of 0.559 mm thick material with a pattern of 12.7mm long slots that have a 0.686mm breadth and are separated 1.191mm forming about a 21 percent open area. An example of such is screen number 3464—HB027 as sold by Pulverizing Machinery, a division of Micro-Pul Corporation.

Alternately, newsprint may be directly placed in a blender and partially defiberized for about 10 minutes with an impact blade having a tip velocity of about 46 meters per second. The newsprint is further fiberized with the impact blade for an additional 3 minutes (an increase of from 2 to 5 minutes) after the addition of carbon black when an admix using newspaper is prepared as hereinafter indicated. The carbon black acts as an abrasive which aids in fiberization and fibrilization.

A plurality of fibrated admixes are prepared for mixing to a twenty percent volume fraction with a Stock C, hereinafter described. The number of parts required to give the twenty percent volume fraction will of course vary with the specific gravity of the chosen fiber and stock formulation. Formulations using non-regenerated cellulose fiber and Stock C require 81.4 parts of fiber to give a twenty percent volume fraction.

A summary of the different fiber preparations are as follows:

TABLE III

| Mix No. | Fiber Source | Fiber Preparation |
|---|---|---|
| 33 | Hardwood Kraft paper, bleached | Hammermill, H.B. Screen |
| 34 | Hardwood Kraft paper, bleached | Hammermill, .508mm round hole screen |
| 35 | Hardwood Kraft paper, bleached | Blade impact, 46 M/sec. |
| 36 | Softwood Kraft paper, unbleached | Hammermill H. B. screen |
| 37 | Softwood Kraft paper, unbleached | Blade impact, 46 M/sec. |
| 38 | Newsprint | Hammermill, H. B. screen |
| 39 | Newsprint | Blade impact, 46 M/sec. |
| 40 | Aramid, 3.2mm, 1.5 denier/filament (type 29) | Hammermill, H. B. screen |
| 41 | Nylon, 3.2mm, 3.0 denier/filament | Hammermill, H. B. screen |
| 42 | Polyester, 3.2mm, 6.0 denier/filament | Hammermill, H. B. screen |

Figure 4:
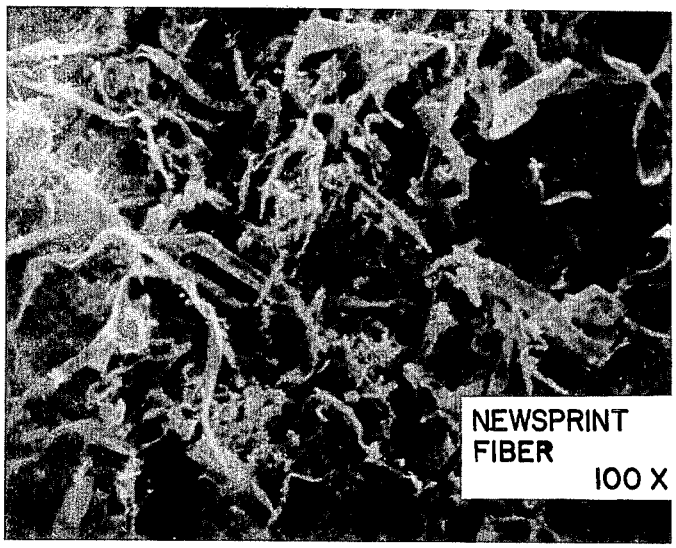
FIG. 4 is an SEM photomicrograph at 100 × magnification showing newsprint fiber as prepared in accordance with the invention.
Figure 7:
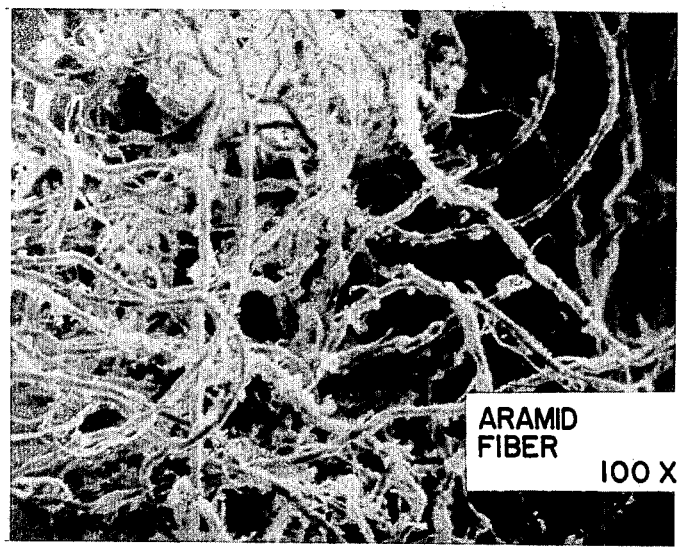
FIG. 7 is an SEM photomicrograph at 100 × magnification showing aramid fiber as prepared in accordance with the invention.

FIGS. 1, 4 and 7 are representative of the variously prepared fiber but are specifically for mixes 33 (hardwood), 38 (newsprint) and 40 (aramid) respectively as processed through the same herringbone screen. The fibers are split, cracked, torn or fibrilated in various degrees. The fiber trunks may include appendaged fibrils or leafy portions (FIGS. 4 and 7). It has been determined that hardwood and softwood fiber may be fibrilated to have more appendaged fibrils than shown in FIG. 1 by controlling the fiber throughput from the hammermill with a more restrictive screen such as the 0.508mm round hole screen for mix 34. The more highly fibrilated hardwood fiber of mix 34 has appendaged fibrils which closely resemble the aramid fiber of FIG. 7. However, the newsprint fiber of FIG. 4 are highly fibrilated with the less intensive mechanical impacting by the hammermill with the herringbone screen.

Table IV lists a general formula for fibrated admix with non-regenerated cellulose fiber of mixes 33 through 39. Parts by weight are adjusted in the formula when using the synthetic fibers of mixes 40-42 to give a twenty percent fiber volume fraction:

TABLE IV

| Ingredient | Parts by weight to fiber | Parts by weight to Stock C |
|---|---|---|
| Fiber, non-regenerated cellulose | 100.00 | 81.4 |
| Ethylene glycol | 8.00 | |
| Adhesive | | |
| Self curing resorcinol/formaldehyde Resin | 7.37 | 6.0 |
| Reaction product of resorcinol and melamine | 2.46 | 2.0 |
| Rubber plasticizer (Structol A-60) | 3.69 | 3.0 |
| Carbon Black (HAF) | 73.71 | 80.0 |
| Oil, napthenic | 49.14 | 40 |

The fibrated admixes are prepared with a blade type blender having a blade tip speed of about 46 meters per second. The ingredients are blended according to the following schedule:

TABLE V

| Ingredients | Blend time, Min. |
|---|---|
| Add: Fiber, ethylene glycol, Reaction product or resorcinol & melamine | 3 |
| Add: Resorcinol formaldehyde resin, rubber plasticizer (fatty acid reaction product) | 2 |
| Add: Carbon black | 2* |
| Add: Oil | 3 |

*increased to 5 minutes when fiber is fiberized with impact blade explained above.

A plurality of fibrated admixes are prepared according to the specification of Table IV using the fiber of mixes 33-42.

Figure 2:
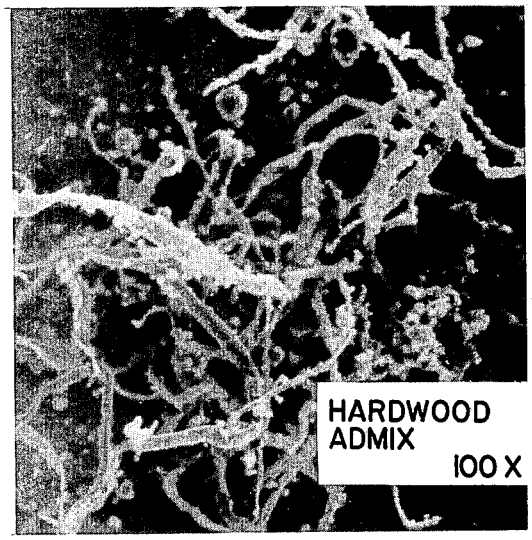
FIG. 2 is an SEM photomicrograph at 100 × and 400 × magnification showing a fibrated admix of the invention which includes fiber of FIG. 1.
Figure 2:
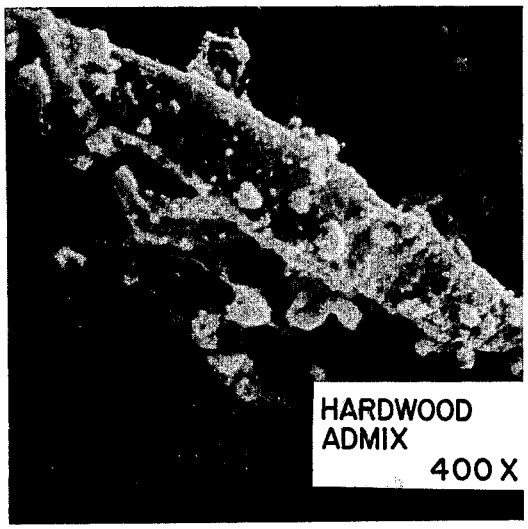
Figure 5:
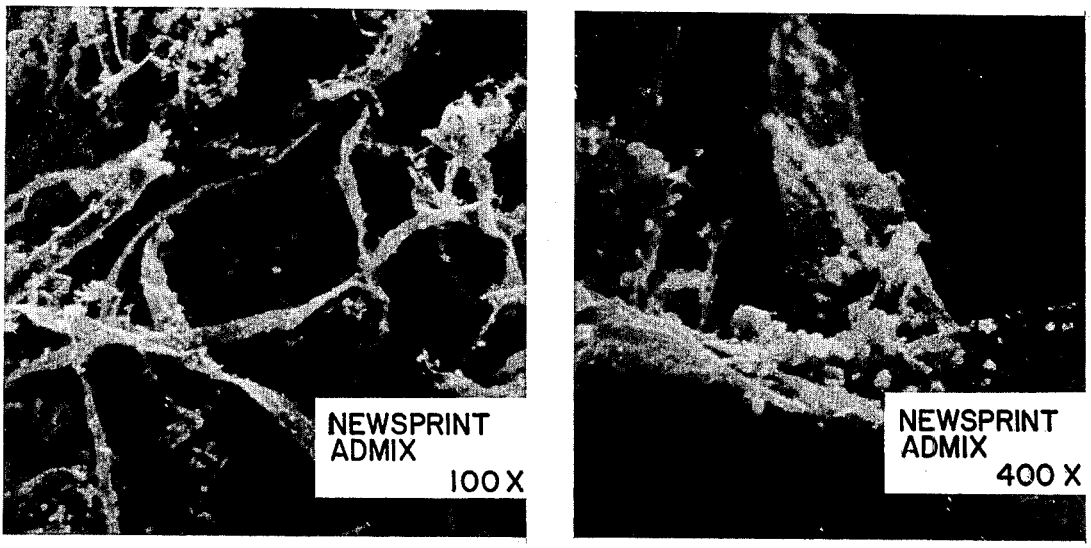
FIG. 5 is an SEM photomicrograph at 100 × and 400 × magnification showing a fibrated admix of the invention which includes fiber of FIG. 4.

FIGS. 2 and 5 are representative of the variously prepared fibrated admixes but are specifically fibrous admixes using fiber of mixes 33 (hardwood) and 38 (newsprint). The hardwood and newsprint fibers appear slightly swollen because of absorption of ethylene glycol or oil. Some of the soluble adhesive is not readily apparent because it is dissolved by the ethylene and absorbed by the fiber. However, small undissolved particles of adhesive are dispersed with the fiber. Of course, if a liquid adhesive were used, it would directly coat or be absorbed into the fiber surface. Consequently, liquid adhesives are preferred as being more efficient.

Figure 3:
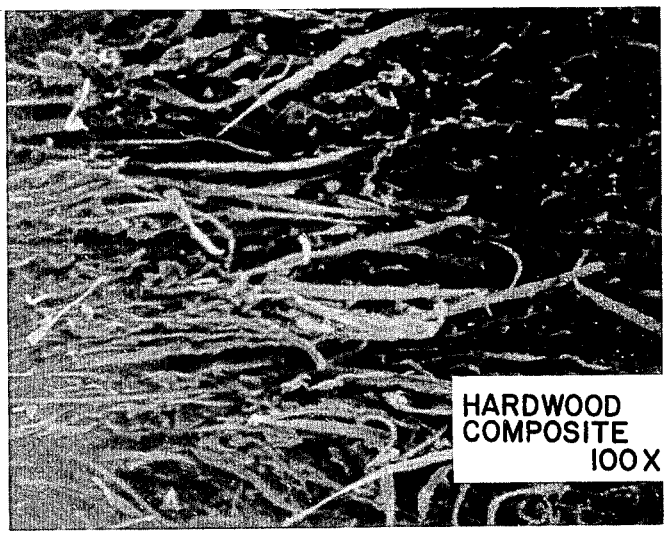
FIG. 3 is an SEM photomicrograph at 100 × magnification showing a cross-grain view of an elastomer-fiber composite at a 20 percent fiber volume fraction with the fibrated admix of FIG. 2.
Figure 8:
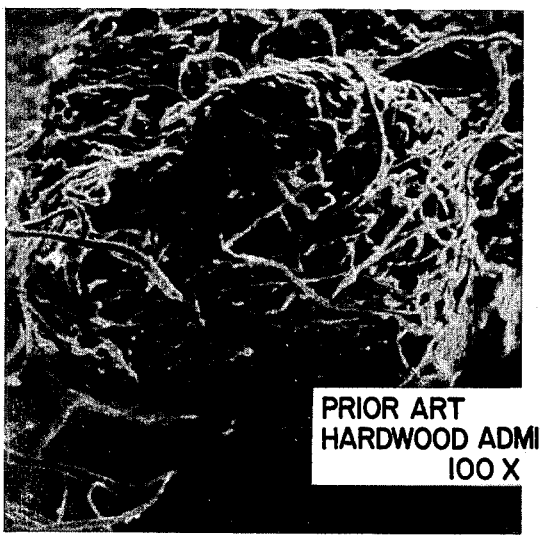
FIG. 8 is an SEM photomicrograph at 100 × and 400 × magnification showing a prior art fibrated admix sold under the trademark "Santoweb D" as manufactured by Monsanto Company.
Figure 8:
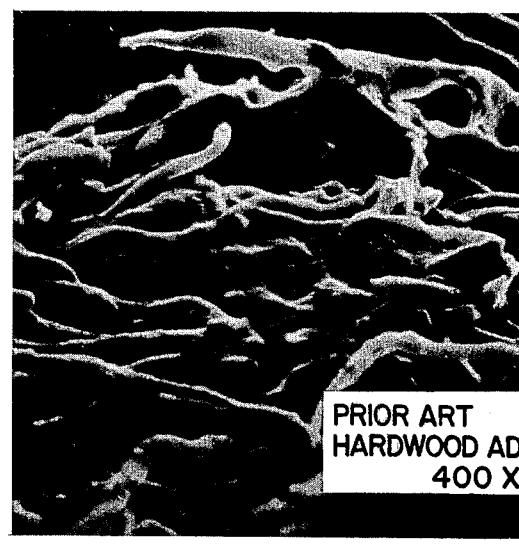

Carbon black coats or dusts the fibers and partially holds them apart, partitioning them from each other. The carbon black appears as a whitish powder on the fiber because the SEM process requires deposition of a conductive coating, like gold, on the sampling being electrically scanned. FIGS. 2 and 3 clearly show how fibers of the admixes are partitioned with carbon black. FIG. 5 also shows carbon black dusted on appendaged fibrils and leafy portions. Comparatively, the prior art of hardwood fiber of FIG. 8 are adhered with latex to each other in a bound cluster.

A Stock C is prepared comprising:

| Ingredient | Parts by weight |
|---|---|
| Styrene-butadiene rubber (SBR) | 100.0 |
| Carbon black* (HAF) | 80.0 |
| Reinforcing filler Precipitated, hydrated silica | 15.0 |
| Zinc oxide | 3.0 |
| Stearic acid | 2.0 |
| Sulfur | 2.0 |
| Oil, napthenic | 40. |
| Accelerator N-t-butyl-2- | 1.75 |

-continued

| Ingredient | Parts by weight |
| --- | --- |
| benzothiazolesultenamide | |
| Anti-oxidant | 2.0 |
| N-isopropyl-N'-phenyl-p-phenyiene diamine | |
| Adhesive system (HRH system for fibers): | |
| Hexamethylene tetramine | 1.6 |
| Resorcinol | 2.5 |

*for a non-regenerated cellulose fibrated admix that includes carbon black parts as designated.

The fibrated admixes are blended with Stock C according to the above noted ASTM mixng procedure. The various mixes are milled, cured, and cut for sample testing as above described. Additionally, Stock C is mixed with a twenty percent volume fraction of hardwood fiber of the prior art Santoweb D fibrated admix. The D type admix is compatible with the SBR of Stock C; however, about 20 parts of SBR are subtracted from the Stock C formulation to offset the approximate equivalent rubber that encapsulates the fiber.

Figure 6:
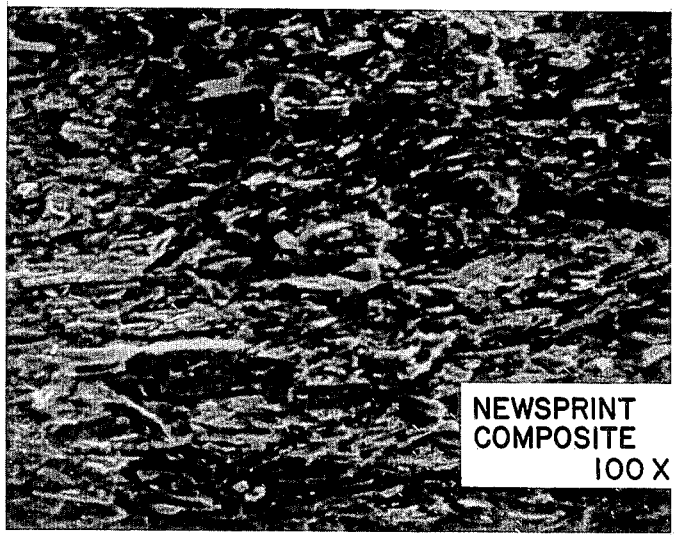
FIG. 6 is an SEM photomicrograph at 100 × magnification showing a cross-grain view of an elastomer-fiber composite of a 20 percent fiber volume fraction with the fibrated admix of FIG. 5.

Size ASTM D412 dumbell samples are prepared from the admixes with the incorporated fiber oriented "with-grain" in some samples and "cross-grain" in other samples. Cross-grain samples are fractured to expose the embedded fiber and show fiber pack, fiber orientation, and fiber dispersion. FIGS. 3 and 6 are representative of the variously prepared fiber-elastomer composites of the fiber of mixes 33–42, but more specifically, are cross-grain fractures showing hardwood fiber of mix 33 and newsprint fiber of mix 38. FIGS. 3 and 6 clearly show that the fiber of the composite of the invention are closely packed to each other and that generally all fibers are oriented in the same direction.

Figure 9:
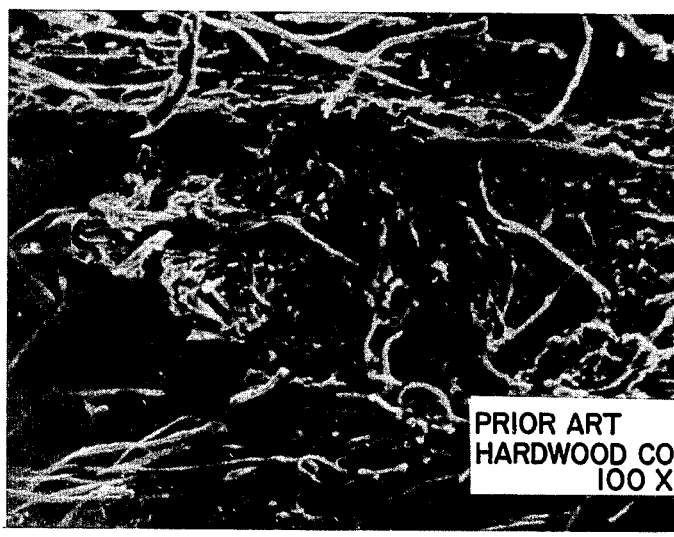
FIG. 9 is an SEM photomicrograph at 100 × magnification showing a cross-grain view of an elastomer-fiber composite at a 20 percent fiber volume fraction with the prior art fibrated admix of FIG. 8.

Comparatively, FIG. 9 is a cross-grain fracture showing prior art fiber as sold under the trademark Santoweb D (hardwood). This prior art composite has unoriented fiber because of undispersed agglomerates or bound clusters which leaves random areas where there is no dispersed fiber. Also, the composites of FIGS. 3 and 6 have a substantially greater number of fibers per unit volume than the composite of FIG. 9 primarily because of the shorter fiber of the invention. It is estimated that the number of fibers in the composites of the invention may be greater than that of the prior art by 25 to 100 percent. It is believed that the improved fiber dispersion, packing and orientation results from the shorter, fibrilated fiber of the invention as compared to the prior art (e.g., the substantially unshortened lengths of hardwood fiber of Santoweb D).

Figure 10:
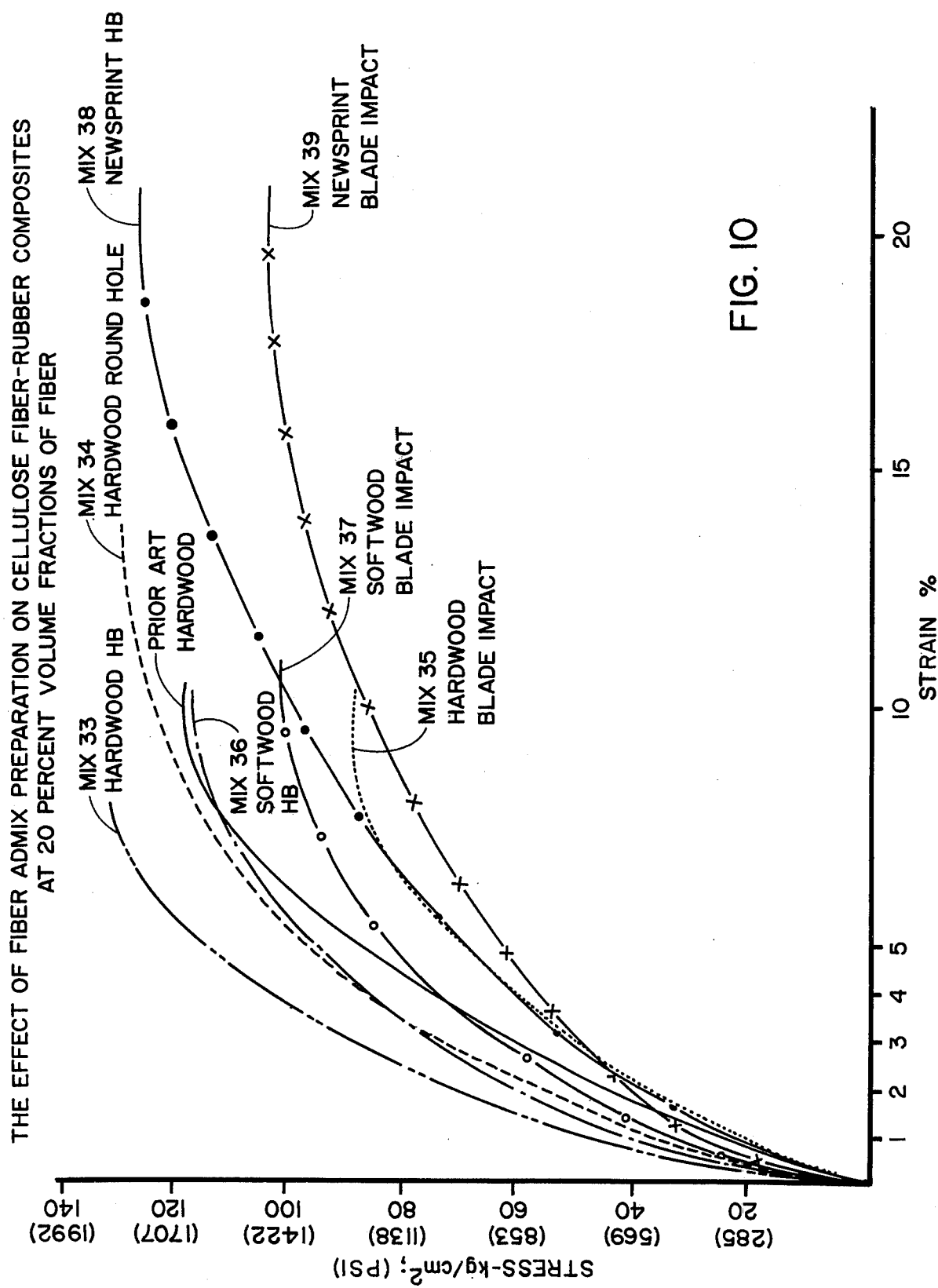
FIG. 10 shows stress-strain profiles for with-grain, elastomer-fiber composites at 20 percent fiber volume fractions for variously prepared hardwood fiber, softwood fiber and newsprint fiber.

The "with-grain" dumbell samples are pulled with a model 1123 Instron tester at a crosshead rate of 5mm per minute using a fifty percent strain sensor so that stress-strain curves may be directly measured. Referring to FIG. 10, stress-strain curves are shown for Stock C composites with a 20 percent volume fraction of fibers using the fiber of mixes 33-39 and prior art hardwood fiber, Santoweb D.

All of the curves show that Young's modulus or tangent modulus are inappropriate as a true indication of the fiber composites characteristic strength because the curves do not have a straight line portion where stress is proportional to strain.

If Young's modulus (i.e., tangent modulus) were used as the primary indicator of the better fiber composite, the blade impacted newsprint fiber (mix 39) is a definite improvement over the prior art hardwood fiber composite because the newspaper composite has a higher stress at the one percent strain level where a tangent line for Young's modulus determination would be drawn. Yet, the prior art hardwood fiber composite has a higher five percent secant modulus than the newspaper composite; and, the newspaper composite has a higher tensile to break and a higher available strain energy (larger projected curve area) than the prior art hardwood composite.

For many situations, the stress fatigue life of a material is indicated by the ratio of that strain energy of a material at a particular stress level (e.g., the projected area under a curve at a 40 Kg/Cm$^2$ stress level) to the total available strain energy available for the material (e.g., the total projected area under the curve up to the point of tensile break). At a 40 Kg/cm$^2$ stress level, the newsprint composite should have a much better fatigue life than the prior art hardwood composite because the newsprint composite would be stressed at a lower percentage of its available strain energy.

It is readily apparent from the stress-strain profiles of FIG. 10 that the hammermilled, herringbone screen, hardwood and softwood fiber composites show increased stress capability over the prior art at lower levels of strain. An inconspicuous aspect disclosed by the profiles is that the stress-strain characteristics of a fiber composite may be influenced by the type of mechanical treatment of the fiber. Fibers may be compounded together in accordance to mechanical treatment, or even blends of different types to give a stress-strain relationship which is independent of changes in a particular fiber aspect ratio.

The disparities in stress-strain profiles for the same fiber type are somewhat suggestive that fiber aspect ratio is not the most prominent parameter to establish a total achievable modulus with admixes of this invention. To more positively determine the affect of fiber aspect ratio on modulus, unbleached softwood Kraft fiber is passed through a hammermill with a herringbone screen as described above. The fiber is then filtered through 20, 42, 60, and 100 mesh screens to a pan. At least 50 fibers as retained on each screen and pan are optically measured to establish an average aspect ratio of fiber length to width. The computed aspect ratios are:

| | |
| --- | --- |
| 20 mesh | 65 |
| 42 mesh | 54 |
| 60 mesh | 42 |
| 100 mesh | 29 |
| Pan | 13 |

Figure 11:
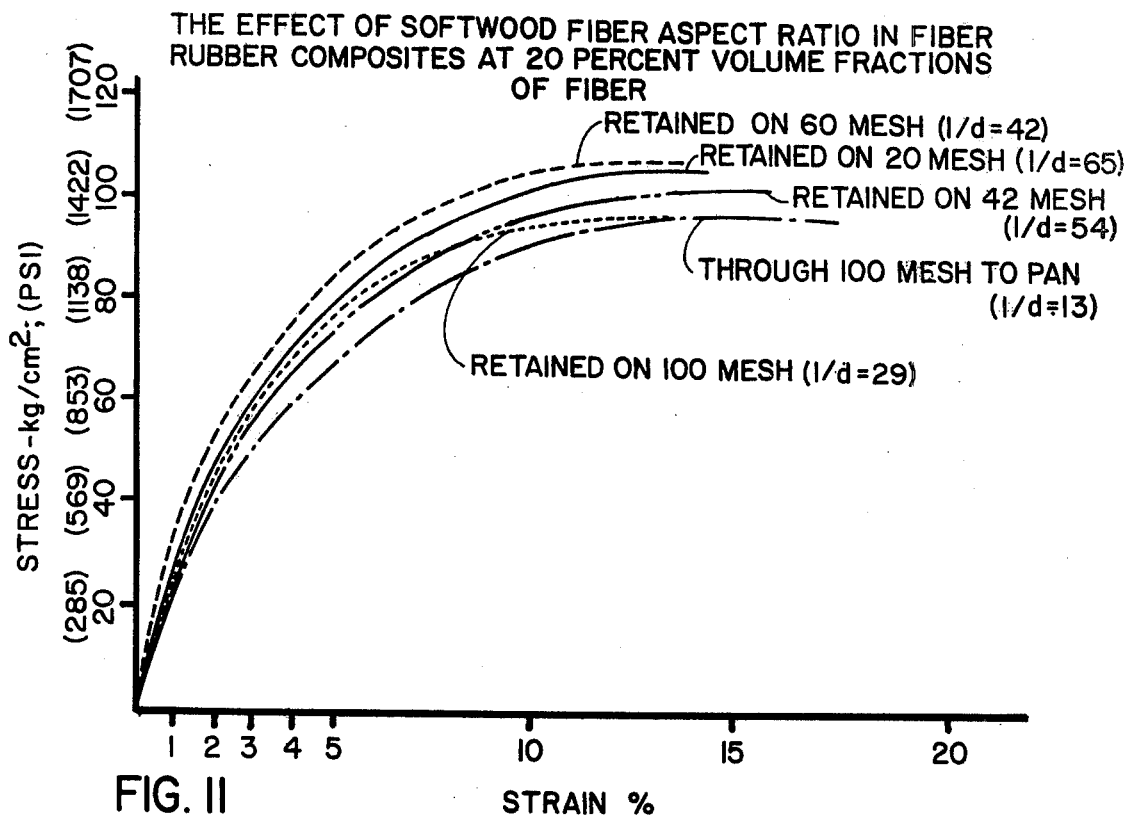
FIG. 11 shows stress-strain profiles for with-grain, elastomer-fiber composites at 20 percent volume fractions for several screen-sized-softwood fiber.

Fibers of each mesh are mixed to a twenty percent volume fraction with Stock C as explained above. The intermingled stress-strain relationships of FIG. 11 show that the resultant moduli of the composites are not primarily affected by fiber aspect ratio. The physical characteristics of the fiber plays a most important part in the physical characteristics of the fiber composite.

Figure 12:
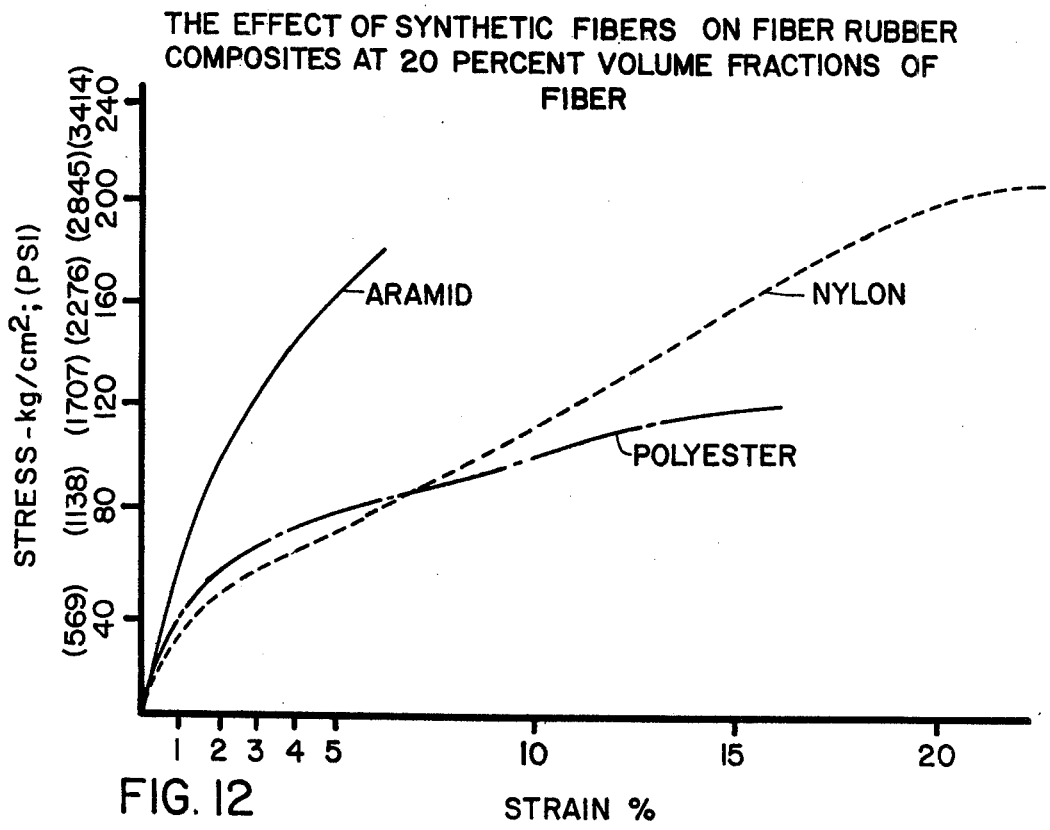
FIG. 12 shows stress-strain profiles for withgrain elastomer-fiber composites at 20 percent fiber volume fractions for variously prepared aramid fiber, nylon fiber and polyester fiber.

FIG. 12 illustrates stress-strain relationships for fiber composites with 20 percent volume fractions of aramid, polyester and nylon fibers as processed through a hammermill with a herringbone screen as above defined. The nylon fibrated admix is prepared as described above for cellulose except that the parts by weight of Stock C are adjusted for the specific gravity of nylon to give the twenty percent volume fraction. The adhesive system for the aramid and polyester fibrated admixes are prepared by pretreating the fibers (before hammermilling) with polymethylene, polyphenylisocycante, drying them at 200° F. and heat reacting the adhesive at 420° F. for about 3 minutes. Stock C parts by weight are also adjusted to give the 20 percent volume fraction for aramid and polyester. The stress-strain relationship of the composite shows the affects of the stress-strain properties of the fiber.

Another primary characteristic to be gleaned from FIG. 10 is that the type of mechanical treatment of a fiber significantly alters the fibers configurartion and its resultant reinforcing affect on a viscoelastomer. Some of the more significant cellulosic fiber alterations are achievable with newsprint fibers. This may be because newsprint fibers may be highly fibrilized because they are stiffened or embrittled with lignin as compared to hardwood or softwood fibers produced through the Kraft process to be free of lignin.

To further evaluate fiber shapes, newsprint material is fiberized and fibrilized with a hammermill having various throughput screens.

Several discharge screen configurations may be used to produce the desired fiber size and shape in accordance with this invention. As noted above, a herring bone screen with a breadth of 0.67mm is satisfactory. Round hole screens are also satisfactory provided they have a diameter which properly sizes the fiber to a desired length while also, in the case of some fibers (i.e., aramid, hardwood, softwood, and especially newsprint) it significantly alters the fiber shape. Through testing, it is determined that screens having a breadth opening of 0.5mm to about 2mm are satisfactory. For this disclosure, breadth refers to the second or width dimension which characterizes a screen opening. Thus, for a herringbone screen, breadth refers to the 0.686mm dimension. In the case of a round hole screen, breadth refers to the diameter. When the breadth dimension is controlled, the median fiber length is also controlled. The breadth dimension substantially controls the median fiber length from about 0.2 to about 2.5 while simultaneously limiting fiber length to a maximum of about 2.9mm. As the breadth is reduced, fibrilization of cellulose fibers is more apparent. Also, the shorter the fiber, the larger bending moment required for bending the fiber. Thus, shorter fibers have less tendancy to cling and tangle; the advantage is that the shorter fibers are easier to mix and pack in a viscoelastomer than the prior art fibers.

A screen found to be beneficial for cellulose, and particularly newsprint, is a rasp trapeze screen with a 0.8mm breadth as distributed by the Alpine American Corporation. The hammermill and rasp trapeze screen substantially alters the shape of newsprint fiber. The fibers are fragmented from a naturally occurring median length of about 2.8mm to a preferred median length of about 1.7mm to about 2.3mm. The fibers are split, torn or otherwise disassociated giving them the appearance of fibrilous particles of fiber trunks that may be split and from which extend appendaged peeled leaf portions and hairy fibrils. When prepared in an admix and blended with Stock C as above noted (exclusive of adhesive) the fibers produce a significant, but reduced reinforcing effect. The modular anisotrophy remains at a ratio of about 2.7 which is about the same as that obtained for mix 38. The 5 percent secant modulus measured in the direction of calendering is about 510 psi compared to the 5 percent secant modulus of 190 psi achieved at 90° to the direction of calendering.

The effect of using this alternate screen is to enable the user to alter the reinforcing efficiency of newsprint, as a function of fiber structure, at constant volume fraction and formulations. For reasons not wholly understood, fiber orientation and modular anisotrophy remain approximately the same as in mix 38. Inspection indicates that the fibrous mass consists of generally broken and fibrilated main fiber trunks with a substantial inclusion of smaller fibrils or "leafy" structures, when incorporated in rubber.

In many situations, the usefulness of a rubber-type elastomer is established by its modular anisotropic characteristics (e.g., the comparison of "with-grain" physical characteristics to the measured at 90° or "cross-grain"). Carbon black is noted for its ability to reinforce rubber without any substantial modular anisotropic affects. Generally speaking, increased parts of carbon black improve modulus and greatly increases the point of tensile break of a rubber stock without significantly impairing the strain level at tensile break. Granular fillers, such as ball-milled cellulose particles and ground wood flour, provide some reinforcement to rubber without modular anisotropic affects except that the strain level at tensile break is greatly reduced, as is modulus, because the granular particles offer very little force transferring capability at their interface with the rubber.

The modular anisotropy of a fiber loaded rubber stock is affected by fiber orientation and dispersion. As previously noted, the direction of stock flow during working such as calendering or extruding, significantly affects fiber orientation. The modular ratio of a typical prior art calendered fiber composite is about 10-15 to 1 (the ratio of "with-grain" to "cross-grain").

However, the modular ratio of elastomer fibercomposites of the invention is about 3-5 to 1. The lower modular ratios are achieved with higher modulus "with-grain" and substantially higher "cross-grain" than the prior art. For example, the 5 percent secant modulus for newsprint fibers, mix 38 is about 920 psi in a direction of fiber orientation and about 325 psi at 90° to fiber orientation which yields a modular ratio of 2.82.

It is believed that the higher "cross-grain" modulus of the invention results from improved fiber dispersion and a greater number of fibers. The prior art teaches the use of long and unbroken fibers whereas the process of this invention yields shorter fibers. Accordingly, at a given fiber volume ratio there are a greater number of discrete fibers mixed with an elastomer in the composite of this invention than was known in the prior art. The greater number of smaller fibers result in a more uniform fiber distribution and a higher degree of fiber packing than the prior art. The fiber distribution and packing avoids any stress concentrations in the stock from unoriented and tangled fibers to give substantially uniform stock strain between adjacent fibers.

The type of fiber configuration as produced by mechanical means described herein to give a fiber composite a low modular ratio characterized by a high "with-grain", and high "cross-grain" modulus yields a fiber-reinforcing affect heretofore unrecognized in the rubber making art. That is, non-regenerated cellulose fibers may be used to reinforce a stock somewhat along the lines provided by carbon black. However, the fibers reinforce rubber to increase modulus at about two and a half times the volumetric rate of carbon black but with a reduction in tensile to break. Thus, a stock may be compounded with just non-regenerated cellulosic fibers and no black or the number of parts of the presently carbon black parts may be reduced. As with carbon black filled stocks, oil may be used from about 5 to about 100 parts by weight of elastomer. When the cellulosic fibers of the invention are used in combination with carbon black as defining the required filler, oil, up to 250 parts may be used with up to 300 parts total weight of filler per 100 parts by weight of elastomer.

More specifically, cellulose fiber of the invention (e.g., having a preferred median length range of about 0.1mm to about 2.3mm) may be dispersed in oil extended rubber, having carbon black as filler, to form a composite where the fiber constitutes from about 5 to about 60 percent by volume of the composite. Preferably, the carbon black plus fiber constitutes from about 20 to about 200 parts by weight per 100 parts by weight of rubber; and the fiber constitutes from about 25 to 60 percent of a combined volume occupied by the carbon black and fiber. Oil may then be included in greater parts than was previously known in the art to adjust the composite secant modulus as desired. Oil is added to constitute at least about 80 percent by weight of the combined carbon black and fiber parts weight so that the oil occupies a volume comprising about 50 to 120 percent of the fiber volume. Very high oil extended fiber-rubber composites may then be formulated to have a 10 percent secant modulus of at least about 50 psi.

The foregoing description is made for the purpose of illustration and is not intended to limit the scope of the invention which is to be determined from the appended claims.

What is claimed is:

1. A process for preparing a fibrated admix which comprises prior to at least partially encasing fiber with a polymer, the steps of:
   fiberizing non-regenerated cellulose to fibers having median lengths of about 0.03mm to 2.9mm;
   fluffing and partially untangling the fibers;
   blending carbon black particles with the fibers from about 5 parts to about 200 parts by weight of carbon black to fiber and simultaneously dusting and partitioning the fibers with the carbon black particles; and
   blending oil with the fibers and carbon black from about 2:1 to about 1:2 ratio of oil by weight to carbon black.

2. The process of claim 1 and further including after the step of fluffing, the steps of:
   conditioning the fibers with an absorbate liquid from about 1 to about 20 parts of liquid by weight to fiber; and
   blending a nonelastomeric adhesive with the fibers and at least partially coating the fibers with adhesive.

3. The process of claim 2 and further including simultaneously during the step of partially coating the step of absorbing portions of the adhesive into fibers.

4. The process of claim 1 and further including the step of fibrilating a plurality of the fibers.

5. The process of claim 1 and further including after the step of blending oil, the step of blending powdered rubber with the fiber, carbon black and oil.

6. A process for preparing a fibrated admix which comprises prior to at least partially encasing fiber with a polymer, the steps of:
   fiberizing defibrated cellulose into fibers including fibrilated fibers by mechanically impacting the cellulose;
   sizing the fibers and controling fibrilation by screening fiber flow from impacting with a throughput screen having openings with a breadth of about 0.5mm to about 2mm;
   blending carbon black particles with the fibers while simultaneously dusting and partitioning fibers with carbon black particles; and
   blending oil with the carbon black and fibers.

7. A process for preparing a fibrated admix which comprises prior to at least partially encasing fiber with a polymer, the steps of:
   fiberizing defibrated cellulose into fibers including fibrilated fibers by mechanically impacting the cellulose to a median fiber length of about 0.1mm to about 2.3mm;
   blending carbon black particles with the fibers while simultaneously dusting and partitioning fibers with carbon black particles; and
   blending oil with the carbon black and fibers.

8. A process for preparing a fibrated admix which comprises prior to at least partially encasing fiber with a polymer, the steps of:
   fiberizing fiber;
   fluffing and partially untangling the fiber;
   blending a particulate partitioning agent with the fiber while simultaneously dusting and partitioning fiber with particulates; and
   blending oil with the partitioned fiber.

9. A process for preparing a fibrated admix comprising the steps of:
   stiffening chopped synthetic fibers with a stiffening agent;
   mechanically reducing the stiffened fibers to a median fiber length of about 0.03mm to about 2.5mm;
   blending a particulate partitioning agent with the fibers while simultaneously dusting and partitioning fibers with particulates; and
   blending oil with the partitioned fibers.

10. A method for preparing a fibrated admix which comprises prior to at least partially encasing fiber with a polymer, the steps of:
    defiberizing newsprint into fibrilous particles by mechanical impacting;
    blending carbon black with the fibrilous particles while simultaneously dusting and partitioning fibrilous particles with carbon black;
    abrading and reducing the fibrilous particles with the carbon black by mechanical impacting while further partitioning the fibrilous particles with a dusting of carbon black; and
    blending oil with the partitioned fibrilous particles.

11. A method for preparing a fibrated admix which comprises prior to at least partially encasing fiber with an elastomer, the steps of:
    fiberizing the defibrated cellulose into fibers including fibrilated fibers by mechanically reducing the cellulose fibers to a median fiber length of about 0.03mm to about 2.9mm;
    fluffing and partially untangling the fibers;
    conditioning the fibers with an absorbate liquid added at about 1 to about 20 parts by weight of fiber;
    blending in an absorbate liquid soluable adhesive at about 1 parts by weight to about 10 parts by weight of fiber and simultaneously absorbing portions of the adhesive into fibers;
    blending in, dusting, and partitioning fibers with carbon black particles at from about 5 to about 200 parts by weight of carbon to fiber;

blending in a carbon black absorbate oil at about 2:1 to about 1:2 ratio of oil to carbon black.

12. A fibrated admix exclusive of a polymer at least partially encasing the fibers, the admix comprising:
fiberized and fibrilated cellulose fibers sized to and having a median length of about 0.03mm to about 2.9mm;
carbon black particles dusted on the fibers, and generally partitioning the fibers from each other; and
oil dispersed with and affixed to the fibers and carbon black particles.

13. The fibrated admix of claim 12 wherein the carbon black particles constitute from about 5 to about 200 parts by weight of fiber.

14. The fibrated admix of claim 13 wherein the oil constitutes from about 2:1 to about 1:2 ratio of oil to carbon black particles by weight.

15. The fibrated admix of claim 12 which further comprises:
an absorbate liquid dispersed in the fiber from about 1 to about 20 parts by weight of fiber; and
an adhesive coated on portions of fibers.

16. A fibrated admix free of a polymer that at least partially encases fiber, the admix, comprising:
cellulose fibers characterized by defibrated cellulose mechanically impacted and sized to pass through a discharge screen having openings with a breadth of about 0.5mm to about 2mm;
carbon black particles dusted on the fibers and generally partitioning the fibers from each other;
oil dispersed with and affixed to the fibers and carbon black particles.

17. The process of claim 8 and including fiberizing fiber to median lengths of about 0.03mm to about 2.9mm, and wherein the fiber is selected from the group consisting of cellulose, aramid, nylon, and polyester.

18. The process of claim 8 and further including sizing the fibers by mechanically impacting the fiber and screening fiber flow from impacting with a throughput screen having openings with a breadth of about 0.5mm to about 2mm.

19. The process of claim 8 and further including the steps of:
blending carbon black particles with the fibers from about 5 parts to about 200 parts by weight of carbon black to fiber and simultaneously dusting and partitioning the fibers with the carbon black particles; and
blending oil with the fibers and carbon black from about 2:1 to about 1:2 ratio of oil by weight to carbon black.

20. The process of claim 8 wherein the partitioning agent is selected from the group consisting of carbon black and clay.

21. The process of claim 8 and further including the step of blending the partitioned fiber and oil with an elastomer.

22. The process of claim 17 wherein the cellulose is newsprint fiber.

* * * * *